April 8, 1941.  J. HLASNEY, JR  2,237,934
ADJUSTABLE TRANSMISSION FOR AIRPLANE MOTORS AND THE LIKE
Filed March 22, 1940  2 Sheets-Sheet 1
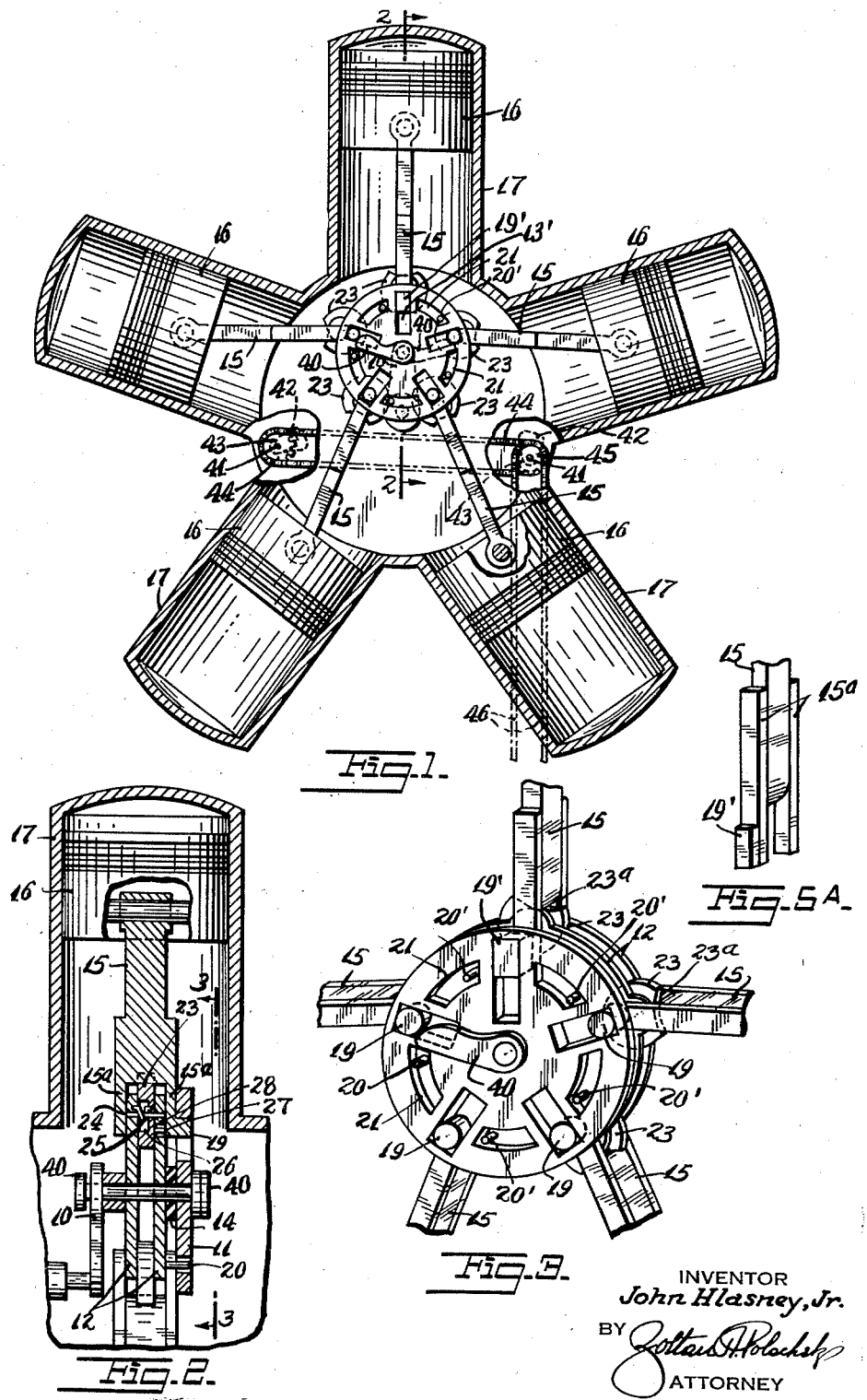

April 8, 1941.  J. HLASNEY, JR  2,237,934
ADJUSTABLE TRANSMISSION FOR AIRPLANE MOTORS AND THE LIKE
Filed March 22, 1940    2 Sheets-Sheet 2

INVENTOR
John Hlasney, Jr.
BY
ATTORNEY

Patented Apr. 8, 1941

2,237,934

UNITED STATES PATENT OFFICE 2,237,934

ADJUSTABLE TRANSMISSION FOR AIR-PLANE MOTORS AND THE LIKE

John Hlasney, Jr., New York, N. Y.

Application March 22, 1940, Serial No. 325,305

9 Claims. (Cl. 123—48)

This invention relates to new and useful improvements in a transmission construction for multi-cylinder engines.

The invention has for an object to construct the transmission for a multi-cylinder engine or other engine in a manner so that when required, adjustments may be made to make the engine develop more than just one maximum H. P. When a greater amount of H. P. output is desired it is proposed that the transmission be adjusted to give a greater capacity in the combustion chamber or chambers so that a larger amount of fuel mixture will be consumed. Therefore the weight per H. P. of the engine will lighten. When a smaller output of H. P. is desired the transmission may be adjusted to reduce the combustion chamber volume of the cylinders. There will then be a smaller maximum fuel consumption, a smaller maximum piston displacement, and a larger weight per H. P.

More specifically, the invention contemplates the provision of an improved transmission construction which may be used in conjunction with the cylinders of an engine to vary the H. P. characteristics thereof by increasing or decreasing the volume of the combustion chamber.

Still further the invention resides in the specific transmission construction illustrated and described.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a transverse sectional view of a multi-cylinder engine with a transmission constructed according to this invention.

Fig. 2 is a fragmentary sectional view on the line 2—2 of Fig. 1.

Fig. 3 is a perspective view of the central portion of Fig. 2 looking in the direction of the line 3—3 thereof.

Fig. 5A is a fragmentary perspective view of the lower end of the connecting rod carrying the master element.

Figure 4:
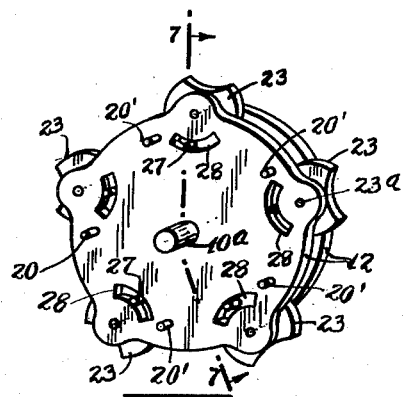
Fig. 4 is a perspective view of the parts shown in Fig. 3 with the front disc removed and with the connecting rods removed.

The adjustable transmission construction for varying the combustion space of an engine, according to this invention, includes a crank 10. A disc 11 is freely mounted on the pin 10$^a$ of the crank. A circular member, consisting of sections 12, is freely mounted on the crank pin 10$^a$. The disc 11 is formed with a plurality of radial slots 13. A friction element 14 is interposed between the disc 11 and the circular member 12 for frictionally connecting these parts so that they have a tendency to maintain relatively fixed positions, and when turned out of these fixed positions they will maintain the new positions.

A plurality of connecting rods 15 for the pistons 16 of an engine having cylinders 17, have forked inner ends 15$^a$ straddling the edge of the circular member 12. One of the fingers 15$^a$ of each connecting rod is provided with a projecting element 19 engaging in one of the radial slots 13 of the disc 11. For each connecting rod there is one radial slot so that each element 19 engages in a separate slot 13. The master connecting rod 15 has its element 19' rectangularly formed for acting as a master element to maintain the disc 11 in its proper position relative to said connecting rod. The slot 13' into which this rectangular element 19' engages, is also longer than the other slots so as not to interfere with the throw of the piston.

A pin 20 for each of the connecting rods 15 is mounted on the circular member 12 and project through arcuate slots 21 formed in the disc 11. These pins and slots act to limit the relative turning of the disc and circular member with respect to each other as to be hereinafter further described.

There is a cam 23 for each connecting rod 15. These cams are mounted on the circular member 12. Specifically, the cams are arranged between the section of the circular member. Each cam 23 is pivotally supported by a pin 24, which passes through the section of the circular member 12. A coil spring 25 is arranged coaxial of each pin 24 within a cavity 26, formed in one face of the cam 23. These springs act between the cams and the circular member for normally resiliently urging the cams into a neutral position. Each cam 23 is in the form of a disc having a concaved edge portion 23ª at one side having a radius equal to the length of the connecting rod. The normal position of the cam is one in which this concaved side 23ª extends outwardly. The cams 23 are limited from turning through too great an amplitude by pins 27 projecting from each cam, and engaging arcuate slots 28 in the circular member 12.

The arrangement permits each cam 23 to pivot in one direction or the other a limited amount only.

Figure 9:
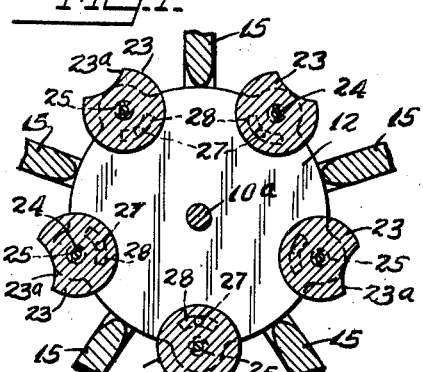
Fig. 9 is a view similar to Fig. 8 but illustrating the connecting rods in different position.

When the pins 20 are at one of the ends of the slots 21, the connecting rods 15 will be rested directly upon the concaved faces 23ª of the cams 23. In these positions the connecting rods 15 cannot move inwards of the slots 13, since they are resting on the cams 23. When the circular member 12 is turned relative to the disc 11, the connecting rods 15 will slip off from the cams 23 and assume positions as illustrated in Fig. 9, that is, between the cams. In these positions the connecting rods 15 may move inwards and outwards as limited by the radial slots 13.

In the latter positions of the connecting rods 15, the stroke of the piston will be smaller than when the connecting rods are in their initial positions. This will be understood by realizing that as the crank 10 rotates the connecting rods 15 will be forced outwards a distance which is determined by the relative positions of the master connecting rod of the disc 11. If the connecting rods 15 are held in extended position by the cams 23, then the pistons 16 will move through a relatively greater distance than would be the case if the connecting rods 15 are off of the cams, and the elements 19 are riding in the slots 13.

A means is provided externally of the engine, which is adapted to shift the circular member 12 relative to the disc 11. This means comprises a pair of cams 40 which extend in opposite directions from the crank pin 10ª of the crank 10. One cam 40 is fixedly mounted upon the crank pin 10ª adjacent the front face of the disc 11, and extends in one direction. The other cam 40 is fixedly mounted upon the pin 10ª adjacent the back face of the circular member 12, and is extended in a direction opposed to the direction in which the first-mentioned cam extends.

This latter means further includes a pair of stub shafts 41 arranged on opposite sides of the crank 10, and extending from the interior to the exterior of the case of the engine. Mounted upon each of the stub shafts 41 there is a cam 42, and each of the cams 42 is in alignment with one of the cams 40. The arrangement is such that the stub shafts may be turned to extend the cams 42 into the path of motion of the cams 40 which are fixed to the crank pin 10ª and move in a circle about the center turning point of the crank 10.

A synchronized means is provided for causing one of the cams 42 to be extended into the path of motion of its respective cam 40, while the other cam 42 is out of the path of motion of its respective cam 40. To accomplish this a sprocket wheel 43 is mounted upon the outer end of each of the stub shafts 41. A chain 44 engages over the sprocket wheels 43 for connecting the stub shafts 41 together for simultaneous movement. One of the stub shafts 41 has a second sprocket wheel 45 over which a second chain 46 engages. This chain 46 extends downwards and connects with a manual means (not shown in drawings) for causing the stub shafts 41 to be simultaneously moved to properly extend and retract the projections 42 into and out of the path of motion of the cams 40. When the cams 42 are extended towards the crank 10, their respective cams 40 will strike thereagainst and turn the pin 10ª. Due to the fact that the circular members 12 are fixed to the pin 10ª while the disc 11 is free, the circular members 12 will be caused to be similarly turned relative to the disc 11.

In Fig. 1 the cam 42 at the left is in its operative position, while the one at the right is in its inoperative position.

Figures 5, 10:
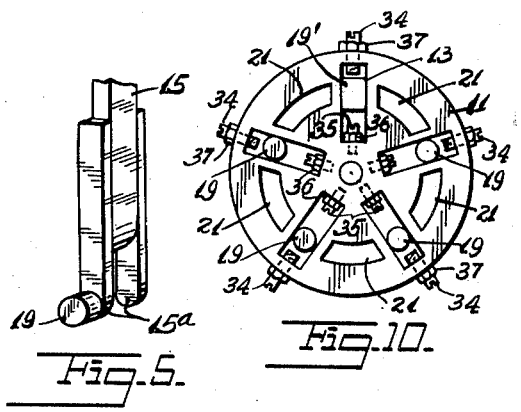
Fig. 5 is a fragmentary perspective view of the lower end of one of the connecting rods.
Fig. 10 is a front view of the front disc of a transmission constructed according to a modification of this invention.
Figure 6:
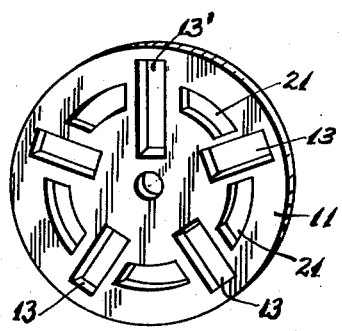
Fig. 6 is a perspective view of the front disc.
Figure 7:
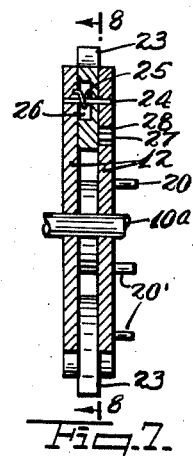
Fig. 7 is a sectional view taken on the line 7—7 of Fig. 4.
Figure 8:
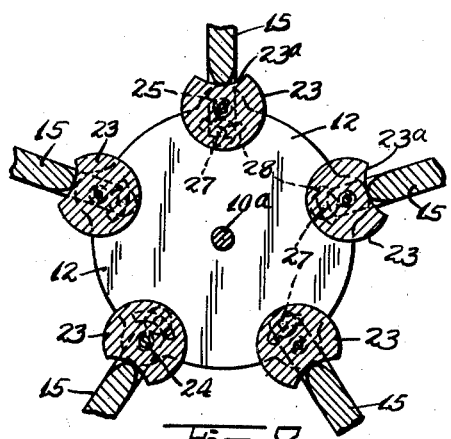
Fig. 8 is a transverse sectional view taken on the line 8—8 of Fig. 7 illustrated with the connecting rods in specific relation thereto.

In Fig. 10 another form of the invention has been disclosed. This distinguishes from the prior form in an arrangement by which the operative lengths of the slots 13 in the disc 11 may be controlled. According to this form of the invention each slot 13 is provided with an adjustment screw 34 adjustably mounted upon the periphery of the disc 11, and extending into the outer end of the slot 13. Each slot 13 is provided with an adjustment screw 35 upon its inner end. This latter adjustment screw is provided with a locking nut 36. The former adjustment screws 34 are provided with locking nuts 37. The elements 19 working in the slots 13 will be limited in their amplitude of possible travel. With this arrangement it is possible to adjust the engine to different amounts of piston displacements when required.

While I have illustrated and described the preferred embodiments of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by United States Letters Patent is:

1. A device for varying the combustion space of a multi-cylinder engine, comprising a crank, a circular member on said crank, a disc free on said crank and having a plurality of radial slots and frictionally connected with said circular member, a plurality of connecting rods for the pistons of said engine and having forked inner ends straddling the edge of said circular member, and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space.

2. A device for varying the combustion space of a multi-cylinder engine, comprising a crank, a circular member on said crank, a disc free on said crank and having a plurality of radial slots and frictionally connected with said circular member, a plurality of connecting rods for the pistons of said engine and having forked inner ends straddling the edge of said circular member, and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, said circular member comprising a pair of adjacent sections.

3. A device for varying the combustion space of a multi-cylinder engine, comprising a crank, a circular member on said crank, a disc free on said crank and having a plurality of radial slots and frictionally connected with said circular member, a plurality of connecting rods for the pistons of said engine and having forked inner ends straddling the edge of said circular member, and projecting cylindrical elements engaging in all except one of said slots, a rectangular element being on one of said forked ends and engaging in said latter slot, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, said circular member comprising a pair of adjacent sections, said cams being located between said sections.

4. A device for varying the combustion space of a multi-cylinder engine, comprising a crank, a circular member on said crank, a disc free on said crank and having a plurality of radial slots and frictionally connected with said circular member, a plurality of connecting rods for the pistons of said engine and having forked inner ends straddling the edge of said circular member and projecting elements engaging in said radial slots, means for relative partial rotation of said circular member and disc, and a cam for each connecting rod mounted on said circular member and against which said piston rod abuts, and in one relative position of said circular member and disc serving to hold the connecting rod and piston extended for minimum combustion space, and another position permitting the connecting rod and piston to assume a position for maximum combustion space, said circular member comprising a pair of adjacent sections, said cams being located between said sections, each cam being pivotally supported and mounted between said sections.

5. A device for varying the combustion space of a multi-cylinder engine, comprising a crank, a circular member on said crank, a disc free on said crank and having a plurality of radial slots and frictionally connected with said circular member, a plurality of connecting rods for the piston of said engine and having forked inner ends straddling the edge of said circular member and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, said circular member comprising a pair of adjacent sections, said cams being located between said sections, each cam being pivotally supported and mounted between said sections, each cam being urged into a neutral position by a spring coaxial with the cam pivot and acting between the cam and one of said sections.

6. A device for varying the combustion space of a multi-cylinder engine, comprising a crank, a circular member on said crank, a disc free on said crank and having a plurality of radial slots and frictionally connected with said circular member, a plurality of connecting rods for the piston of said engine and having forked inner ends straddling the edge of said circular member and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, and circular member comprising a pair of adjacent sections, said cams being located between said sections each cam being pivotally supported and mounted between said sections and provided with a projecting pin, each cam being urged into a neutral position by a spring coaxial with the cam pivot and acting between the cam and one of said sections, said pin projecting from each cam and working in the slot in one of the sections whereby to limit the positions of the cam.

7. A device for varying the combustion space of a multi-cylinder engine, comprising a crank, a circular member free on said crank, a disc free on said crank and having a plurality of radial slots and frictionally connected with said circular member, a plurality of connecting rods for the pistons of said engine and having forked inner ends straddling the edges of said circular member and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, each cam being in the form of a disc having a concaved area at one side, the connecting rods being engageable with this concaved area on one of the relative positions of said circular member and disc.

8. A device for varying the combustion space of a multi-cylinder engine, comprising a crank, a circular member on said crank, a disc free on said crank and having a plurality of radial slots and frictionally connected with said circular member, a plurality of connecting rods for the pistons of said engine and having forked inner ends straddling the edge of said circular member and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, each cam being in the form of a disc having a concaved area at one side, the connecting rods being engageable with this concaved area on one of the relative positions of said circular member and disc, and means mounted at the ends of said radial slots for varying the distances through which said elements may travel.

9. A device for varying the combustion space of a multi-cylinder engine, comprising a crank, a circular member on said crank, a disc free on said crank, and having a plurality of radial slots and frictionally connected with said circular member, a plurality of connecting rods for the pistons of said engine and having forked inner ends straddling the edge of said circular member and projecting elements engaging in said radial slots, means for relative partial rotation of said circular member and disc, and a cam for each connecting rod mounted on said circular member and against which said connecting rod abuts, and in one relative position of said circular member and disc serving to hold the connecting rod and piston extended for minimum combustion space, and another position permitting the connecting rod and piston to assume a position for maximum combustion space, each cam being in the form of a disc having a concaved area at one side, the connecting rods being engageable with this concaved area on one of the relative positions of said circular member and disc, and means mounted at the ends of said radial slots for varying the distances through which said elements may travel, said means comprising adjustment screws mounted on the ends of the slots and adapted to be extended or retracted as required.

JOHN HLASNEY, Jr.